United States Patent
Yang

(10) Patent No.: US 10,334,427 B2
(45) Date of Patent: Jun. 25, 2019

(54) IN-ADVANCE ESIM MANAGEMENT NOTIFICATION

(71) Applicant: Apple Inc., Cupertino, CA (US)

(72) Inventor: Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/940,804

(22) Filed: Mar. 29, 2018

(65) Prior Publication Data

US 2018/0295500 A1 Oct. 11, 2018

Related U.S. Application Data

(60) Provisional application No. 62/482,808, filed on Apr. 7, 2017.

(51) Int. Cl.
| | |
|---|---|
| *H04W 8/18* | (2009.01) |
| *H04W 12/06* | (2009.01) |
| *H04W 60/00* | (2009.01) |
| *H04L 29/06* | (2006.01) |
| *H04W 4/50* | (2018.01) |

(52) U.S. Cl.
CPC ........... *H04W 8/183* (2013.01); *H04W 12/06* (2013.01); *H04W 60/00* (2013.01); *H04L 63/0853* (2013.01); *H04W 4/50* (2018.02)

(58) Field of Classification Search
CPC ....... H04W 8/183; H04W 4/50; H04W 12/06; H04W 60/00; H04L 63/0853
USPC ................. 455/432.1, 432.2, 432.3, 558, 411
See application file for complete search history.

(56) References Cited

U.S. PATENT DOCUMENTS

| | | | |
|---|---|---|---|
| 6,556,820 B1* | 4/2003 | Le ........................... | H04W 8/26 340/7.21 |
| 2011/0201318 A1* | 8/2011 | Kobylarz ................ | H04W 4/00 455/414.1 |
| 2013/0227646 A1* | 8/2013 | Haggerty ............ | H04L 63/0853 726/3 |
| 2015/0110035 A1* | 4/2015 | Lee ....................... | H04W 8/183 370/329 |
| 2016/0007190 A1* | 1/2016 | Wane ...................... | H04W 4/50 455/419 |
| 2016/0020802 A1* | 1/2016 | Lee ....................... | H04B 1/3816 455/558 |
| 2016/0066189 A1* | 3/2016 | Mahaffey ................ | G06F 21/88 455/405 |
| 2017/0264611 A1* | 9/2017 | Alen ....................... | H04L 63/10 |

* cited by examiner

*Primary Examiner* — Kamran Afshar
*Assistant Examiner* — Farid Seyedvosoghi
(74) *Attorney, Agent, or Firm* — Dickinson Wright RLLP

(57) ABSTRACT

Techniques to manage notifications for state changes of eSIMs of a mobile device are described. Processing circuitry of the mobile device provides a command to the eUICC to delete an eSIM. The eUICC changes the state of the eSIM to a locked state and generates a notification of the forthcoming state change before completion of the transition to the deleted state. The processing circuitry sends the notification to a provisioning server and provides to the eUICC a response indicating successful delivery of the notification, and the eUICC subsequently transitions the eSIM to the deleted state. While the eSIM is in the locked state, applications and files of the eSIM can be unusable. In some embodiments, credentials of the eSIM can be reused to re-authenticate with a wireless network in order to deliver the notification to the provisioning server.

20 Claims, 9 Drawing Sheets

IN-ADVANCE ESIM MANAGEMENT NOTIFICATION

CROSS-REFERENCE TO RELATED APPLICATIONS

The present application claims the benefit of U.S. Provisional Application No. 62/482,808, entitled "IN-ADVANCE eSIM MANAGEMENT NOTIFICATION," filed Apr. 7, 2017, the content of which is incorporated herein by reference in its entirety for all purposes.

FIELD

The described embodiments set forth techniques for deleting or disabling electronic Subscriber Identity Modules (eSIMs) with in-advance notification messaging on embedded Universal Integrated Circuit Cards (eUICCs) included in mobile devices.

BACKGROUND

Many mobile devices are configured to use removable Universal Integrated Circuit Cards (UICCs) that enable the mobile devices to access services provided by Mobile Network Operators (MNOs). In particular, each UICC includes at least a microprocessor and a read-only memory (ROM), where the ROM is configured to store an MNO profile that the mobile device can utilize to register and interact with an MNO. Typically, a UICC takes the form of a small removable card, (commonly referred to as a Subscriber Identity Module (SIM) card), which is configured to be inserted into a UICC-receiving bay included in a mobile device. In more recent implementations, however, UICCs are being embedded directly into system boards of mobile devices. These embedded UICCs (eUICCs) can provide several advantages over traditional, removable UICCs. For example, some eUICCs include a rewritable memory that can facilitate installation, modification, and/or deletion of one or more eSIMs, which can provide for new and/or different services and/or updates for accessing extended features provided by MNOs. An eUICC can store a number of MNO profiles—also referred to herein as eSIMs—and can eliminate the need to include UICC-receiving bays in mobile devices. Moreover, eSIMs can be remotely provisioned to mobile devices, which can substantially increase flexibility when users travel to different countries, migrate their phone numbers to different MNOs, and the like. Additionally, eSIMs on eUICCs can be remotely managed from network servers communicating through mobile device processors to an eUICC of the mobile device.

Methods for managing eSIMs of mobile devices include both MNO-centric approaches, involving network equipment of an MNO, such as a provisioning server, communicating directly with an eUICC of a mobile device through an over-the-air (OTA) secure channel, and device-centric approaches, involving a processor of the mobile device initiating and/or participating in the management of eSIMs on the eUICC of the mobile device. Modifications to eSIMs on the eUICC of the mobile device are generally acknowledged to the applicable MNO network equipment; however, when disabling or deleting an eSIM on the eUICC, communication to the MNO network equipment can be disrupted, which can interfere with proper delivery of notifications to the MNO network equipment.

SUMMARY

Representative embodiments set forth techniques for managing generation and delivery of notifications for state changes of electronic Subscriber Identity Modules (eSIMs) of a mobile device. According to some embodiments, mobile device processing circuitry external to an embedded Universal Integrated Circuit Card (eUICC) included in the mobile device provides a command to the eUICC to delete or to disable an eSIM of the eUICC. In response to the command, the eUICC changes the state of the eSIM to a locked state and generates a notification of the forthcoming state change (to the deleted state or to the disabled state) before completion of the transition to the deleted state (or to the disabled state). The processing circuitry of the mobile device retrieves the notification, which can be responsive to an indication from the eUICC that a state change for the eSIM has occurred. The indication from the eUICC can be provided through a REFRESH command, while the processing circuitry can obtain the notification of the forthcoming state change for the eSIM using a GET NOTIFICATION command. The processing circuitry of the mobile device can send the notification retrieved from the eUICC to an applicable network entity, such as to a provisioning server of a Mobile Network Operator (MNO). After successful delivery of the notification, the processor can perform a cleanup operation to purge credentials and reset or otherwise flush software stacks associated with wireless communication for the eSIM. The processing circuitry can provide to the eUICC a response indicating successful delivery of the notification to the applicable network entity, and subsequently the eUICC can complete the transition of the eSIM to the deleted state (or to the disabled state). While the eSIM of the eUICC is in the locked state, applications and files of the eSIM on the eUICC can be unusable. In some embodiments, the processing circuitry of the mobile device can reuse credentials of the eSIM to re-authenticate with a wireless network in order to deliver the notification to the provisioning server.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
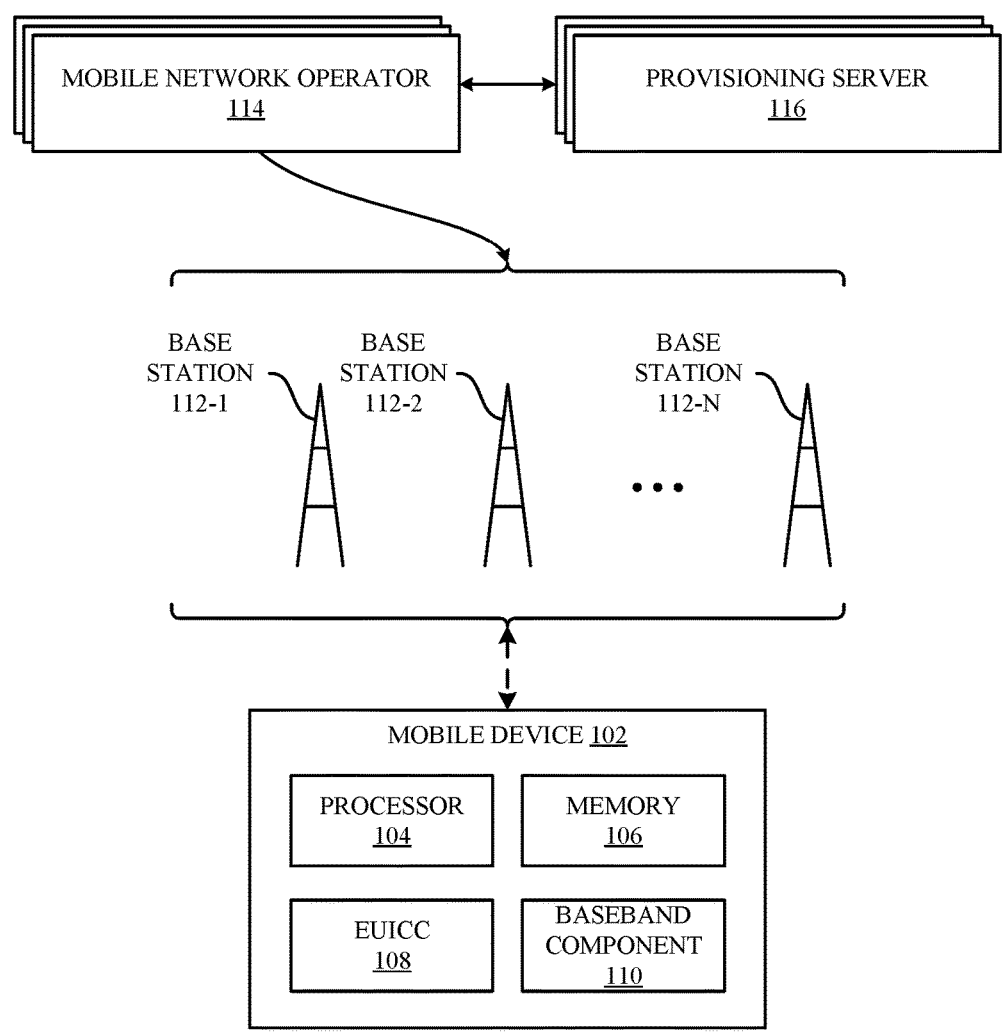
FIG. 1 illustrates a block diagram of different components of an exemplary system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments of methods and apparatus presented herein provide for generation and communication of in-advance notifications for state changes of electronic Subscriber Identity Modules (eSIMs), which can also be referred to as embedded SIMs or as profiles, of an embedded Universal Integrated Circuit Card (eUICC) of a mobile device. The notifications can be generated before the actual state change occurs. The notifications can be provided by the eUICC to an entity external to the eUICC, e.g., to processing circuitry of the mobile device, in response to a command to disable or to delete an eSIM on the eUICC. The eUICC can change the state of the eSIM to a locked state when generating the notification and can indicate to the external entity that a state change for the eSIM has occurred (before the actual occurrence of the state change) for which the notification is available for retrieval. The indication by the eUICC to the external entity can include a "REFRESH" command, in some embodiments. The external entity can retrieve the notification from the eUICC and send the in-advance notification to an applicable network entity, e.g., to a provisioning server of a wireless network. The eUICC can maintain the eSIM in the locked state until receiving a response from the external entity indicating that the notification has been successfully delivered to the applicable network entity. While the eSIM is in the locked state, the external entity can use credentials of the eSIM to authenticate with the wireless network if required to provide the notification to the applicable network entity. After providing the notification to the applicable network entity, the external entity can purge credentials for the eSIM, cause a reset of software stacks used for wireless communication for the eSIM, and can provide an indication to the eUICC of the successful delivery of the notification to the applicable network entity. The eUICC can subsequently change the state of the eSIM from the locked state to the disabled state or to the deleted state (depending on the initial disable/delete command) after receiving the indication of the successful delivery of the notification to the network entity. By generating the notification for the eSIM state change in advance of the actual eSIM state change, the eUICC can guarantee that the credentials for the eSIM are available for use if required to provide for delivery of the notification to the applicable network entity.

Remote SIM provisioning (RSP) and Remote Profile Management (RPM) allow a mobile network operator (MNO) to provision an eSIM (profile) remotely and to change data and states for an eSIM on an eUICC of a mobile device. Notification of a state change for an eSIM on the eUICC, e.g., in response to an enable/disable/delete command from an external entity, can be generated by and then provided by the eUICC to the external entity to indicate occurrence of the state change for the eSIM. The external entity can include processing circuitry of the mobile device, which can provide the notification to an applicable network entity, such as an MNO provisioning server. The command to change the state of the eSIM can originate from the MNO provisioning server can be provided to the eUICC through the processing circuitry of the mobile device. The processing circuitry of the mobile device can retrieve the notification from the eUICC in response to an indication of a state change for the eSIM, e.g., based on receipt of a "REFRESH" command from the eUICC. The processing circuitry can trigger the state change of the eSIM on the eUICC in response to a command from an applicable network entity, e.g., from the provisioning server. Alternatively, the processing circuitry can be made aware of the state change of the eSIM on the eUICC triggered by the provisioning server, e.g., responsive to an encrypted command from the provisioning server provided transparently to the eUICC by the processing circuitry, which cannot read the encrypted command. Prompted by the eUICC, the processing circuitry of the mobile device retrieves the notification of the state change for the eSIM and sends the notification to a corresponding network-based server, e.g., to the provisioning server. Delivery of the notification can be only best effort without guaranteed delivery. If the mobile device is unable to establish or maintain a connection with a wireless network, e.g., unable to use credentials to authenticate when the state change for the eSIM causes the eSIM to be disabled or deleted, the notification of the state change may be not delivered to the provisioning server. To ensure successful delivery of the notification of the state change for the eSIM (or at least improve the likelihood thereof), the notification can be generated before completion of the execution of the state change command, e.g., before loss of connectivity occurs. Thus, if the mobile device has no other connectivity options (e.g., wireless local area network connectivity is unavailable), the notification generated before (rather than after) the state change for the eSIM completes can be delivered successfully to the applicable network entity, e.g., to the provisioning server, using the existing eSIM credentials if required to maintain and/or to re-establish an over-the-air (OTA) wireless cellular connection.

As an MNO can seek to re-deploy a deleted eSIM to another mobile device, e.g., when migrating the eSIM to a new mobile device from a previous older mobile device, the re-deployed eSIM may use some of the same credentials and/or the same International Circuit Card Identifier (ICCID) as used for the deleted eSIM. The MNO can effectively seek to transfer the eSIM from a first mobile device to a second mobile device to allow for transfer for the functionality provided by the eSIM to the second mobile device, similar to that provided by a physical swap of a physical eSIM between two mobile devices. Reuse of some specific eSIM credentials and/or identifiers can avoid the need to download a new eSIM to the second mobile device (after deletion of the old eSIM from the first mobile device), where a new eSIM would result in updates for various network-managed back-end eSIM management functions, e.g., billing systems, activation, etc. For an existing customer, reuse of an existing eSIM from an old mobile device can provide for setting up a new mobile device more quickly and seamlessly than assigning a new eSIM to the new mobile device. The MNO can control the redeployment of eSIMs to ensure that cloning of the eSIM in an active state across multiple mobile devices is avoided.

Before redeploying the eSIM to the second mobile device, the MNO can wait to receive notification that the eSIM of the first mobile device has been successfully deleted (or disabled). If the eUICC of the first mobile device disables and/or deletes the eSIM before providing the notification of the state change of the eSIM to the applicable network entity for the MNO, the first mobile device may lack connectivity options to provide the notification of the state change of the eSIM, e.g., when all eSIMs of the first mobile device are disabled and/or deleted. While supplemental wireless connectivity may exist for the first mobile device, e.g., via a wireless local area connection, a secure available connection for the first mobile device to communicate the notification of the state change of the eSIM to the applicable network entity may not be available. By generating the notification of the state change of the eSIM of the eUICC before completing execution of a disable command or a delete command, the mobile device can continue to use valid credentials and/or identifiers (IDs) for the (soon-to-be-disabled/deleted) eSIM for at least a limited period of time in order to communicate the notification of the state change of the eSIM.

To prevent inadvertent cloning of the eSIM, where a notification of the eSIM state change is generated and provided to a provisioning server of a wireless network by the eUICC but deletion or disablement of the eSIM does not occur, the generation of the notification of the eSIM state change should not occur too far in advance of the actual completion of the eSIM state change. Processing circuitry of the mobile device external to the eUICC can ascertain that a state change for an eSIM is forthcoming, e.g., based on receipt of a readable command to disable/delete the eSIM from a network entity and/or based on receipt of an indication from the eUICC of the eSIM state change. The processing circuitry of the mobile device external to the eUICC can be restricted to read only access (if at all) of an RPM command communicated to the eUICC through the processing circuitry and can recognize that successful delivery of a notification of a state change for the eSIM can be required. The eUICC can generate the notification of the state change for the eSIM in advance (pre-generate) rather than after (post-generate) completion of the command to disable/delete the eSIM on the eUICC. The processing circuitry of the mobile device external to the eUICC and/or the eUICC can determine whether in-advance notification should be used, e.g., based on a profile policy, based on parameter options in a command, and/or based on an eUICC platform level setting.

In some embodiments, the eUICC provides an indication of the eSIM state change to the processing circuitry, e.g., by sending a REFRESH command to the processing circuitry. Rather than sending the indication after completion of the eSIM state change, the eUICC provides the indication before completion of the eSIM state change. The processing circuitry can obtain a notification of the eSIM state change from the eUICC before completion of the eSIM state change and send the notification of the eSIM state change to an applicable network entity, e.g., to a network-based provisioning server. If necessary to deliver the notification of the eSIM state change to the applicable network entity, the processing circuitry can maintain network software stacks and/or credentials for the eSIM for a limited time and/or for a limited number of re-uses in order to ensure a cellular wireless connection based on the eSIM can be used for the delivery of the notification. In some embodiments, the processing circuitry delivers the notification of the eSIM state change using a wireless connection other than a cellular wireless connection, e.g., via a wireless local area network connection, when such a connection is available. In some embodiments, the processing circuitry uses the credentials of the eSIM to authenticate or re-authenticate with a wireless network in order to establish and/or to maintain a cellular wireless connection with the wireless network to permit delivery of the notification of the eSIM state change to the applicable network entity. In some embodiments, the eUICC changes the state of the eSIM from an enabled state to a locked state, which can be a temporary transition state for the eSIM used from generation of the notification of the eSIM state change until completing execution of a commanded state change of the eSIM to a disabled state or to a deleted state. In some embodiments, the processing circuitry retrieves the notification of the eSIM state change from the eUICC in response to the indication, e.g., in response to receipt of a REFRESH command. In some embodiments, the processing circuitry retrieves the notification of the eSIM state change based on knowledge of the planned, but yet to be completed, state change for the eSIM. In some embodiments, the eUICC maintains the eSIM in the locked state until receiving an indication from the processing circuitry of the mobile device that the notification of the eSIM state change has been successfully delivered to an applicable network entity, e.g., to a network-based provisioning server. In some embodiments, the processing circuitry of the mobile device provides to the eUICC an indication of the successful delivery of the notification of the eSIM state change to the applicable network entity. In some embodiments, the eUICC changes the state of the eSIM from the locked state to the disabled state or to the deleted state after receiving confirmation of the successful delivery to the applicable network entity of the notification of the eSIM state change. In some embodiments, when the eUICC is not provided an indication of successful delivery to an applicable network entity of the notification of the eSIM state change, the eUICC maintains the eSIM in the locked state and the eSIM is not usable by the mobile device. In some embodiments, an eSIM can only be deleted from the locked state and cannot be changed from the locked state to another state, such as to a disabled state or to an enabled state. In some embodiments, an eSIM in the locked state can be used by the mobile device with a restricted functionality, e.g., for a limited time period, for a limited number of re-uses, and/or for a limited purpose, such as to allow delivery of the notification to an applicable network entity.

In some embodiments, when the processing circuitry of the mobile device initiates a state change for an eSIM from an enabled state to a disabled state or to a deleted state, the processing circuitry can indicate to the eUICC that a confirmation is not required, e.g., a REFRESH command is not required and the processing circuitry assumes that the state change for the eSIM will occur. In some embodiments, a REFRESH command is used to ensure synchronization of a state of an eSIM on the eUICC with a state for the eSIM maintained by the processing circuitry of the mobile device that is external to the eUICC. In some embodiments, when the processing circuitry of the mobile device is not the initiator of the state change for the eSIM of the eUICC, such as when a network entity sends an encrypted RPM command to disable or to delete the eSIM via the processing circuitry, an indication of the in-process state change for the eSIM is provided by the eUICC to the processing circuitry, e.g., by sending a REFRESH command to the processing circuitry. In some embodiments, after sending the notification of the eSIM state change to the applicable network entity, the processing circuitry of the mobile device external to the eUICC performs a context update, e.g., by resetting wireless network software stack and/or by deleting credentials for the eSIM before sending a confirmation response to the eUICC of the successful delivery of the notification of the eSIM state change. In some embodiments, use of the credentials of the eSIM while the eSIM is in the locked state is not allowed and alternative error handling can be invoked. In some embodiments, the use of the credentials of the eSIM, while the eSIM is in the locked state, can be restricted to a limited number of attempts to establish, re-establish, authenticate, re-authenticate, or maintain a cellular wireless connection with a wireless network. In some embodiments, the use of the credentials of the eSIM, while the eSIM is in the locked state, can be restricted to only certain functions, such as those required to permit delivery (or attempted delivery) of the notification of the eSIM state change to an applicable network entity, e.g., to a network-based provisioning server.

These and other embodiments are discussed below with reference to FIGS. 1 through 9; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102, a group of base stations 112 that are managed by different Mobile Network Operators (MNOs) 114, and a set of provisioning servers 116 that are in communication with the MNOs 114. According to the illustration of FIG. 1, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice and data) to which the mobile device 102 can be subscribed.

As shown in FIG. 1, the mobile device 102 can include processing circuitry, which can include a processor 104 and a memory 106, an eUICC 108, and a baseband component 110. These components work in conjunction to enable the mobile device 102 to provide useful features to a user of the mobile device 102, such as localized computing, location based services, and Internet connectivity. The eUICC 108 can be configured to store multiple eSIMs for accessing the different MNOs 114 through the base stations 112. For example, the eUICC 108 can be configured to store and manage one or more eSIMs for one or more MNOs 114 for different subscriptions to which the mobile device 102 is associated. To be able to access services provided by the MNOs, an eSIM is provisioned to the eUICC 108. In addition, eSIMs stored on the eUICC 108 can be updated, modified, enabled, disabled, and/or deleted via communication between the eUICC 108 of the mobile device 102 and applicable network equipment, such as the provisioning servers 116 (or other equivalent or similar network-based eSIM management entities, such as a Subscription Manager-Data Preparation (SM-DP) unit). In some embodiments, eSIMs are pre-stored in the eUICC 108 in a disabled state, and during a provisioning process, the eUICC 108 obtains MNO credentials (e.g., keys, etc.), service information (e.g., carrier information, services subscribed to), and/or other information, and uses this information to enable the eSIM. In some embodiments, eSIMs are not pre-stored in the eUICC 108, and the eUICC 108 obtains one or more eSIMs from one or more associated provisioning servers 116. It is noted that provisioning servers 116 can be maintained by a manufacturer of the mobile device 102, the MNOs 114, third party entities, and the like. Communication of eSIM data between a provisioning server 116 and the eUICC 108 can use a secure communication channel, over which a series of commands between the provisioning server 116 and the eUICC 108 results in provisioning (or other management) of an eSIM to (or on) the eUICC 108. In some embodiments, the eSIM data is communicated via the processing circuitry, e.g., the processor 104, of the mobile device 102. In some embodiments, the eSIM data is communicated to the processor 104 of the mobile device 102 for loading to and/or installing in the eUICC 108 while connected to the provisioning server 116. In some embodiments, the eSIM data is communicated to the processor 104 for subsequent loading to and/or installing in the eUICC 108 without a parallel connection to the provisioning server and/or secure through connection between the provisioning server and the eUICC 108 during the loading and/or installation process, e.g., using an offline process. Although not illustrated in FIG. 1, the mobile device 102 can also be configured to include a receiving bay for a removable UICC (e.g., a SIM card), on which an eSIM can be managed in a similar manner using the techniques described herein.

Figure 2:
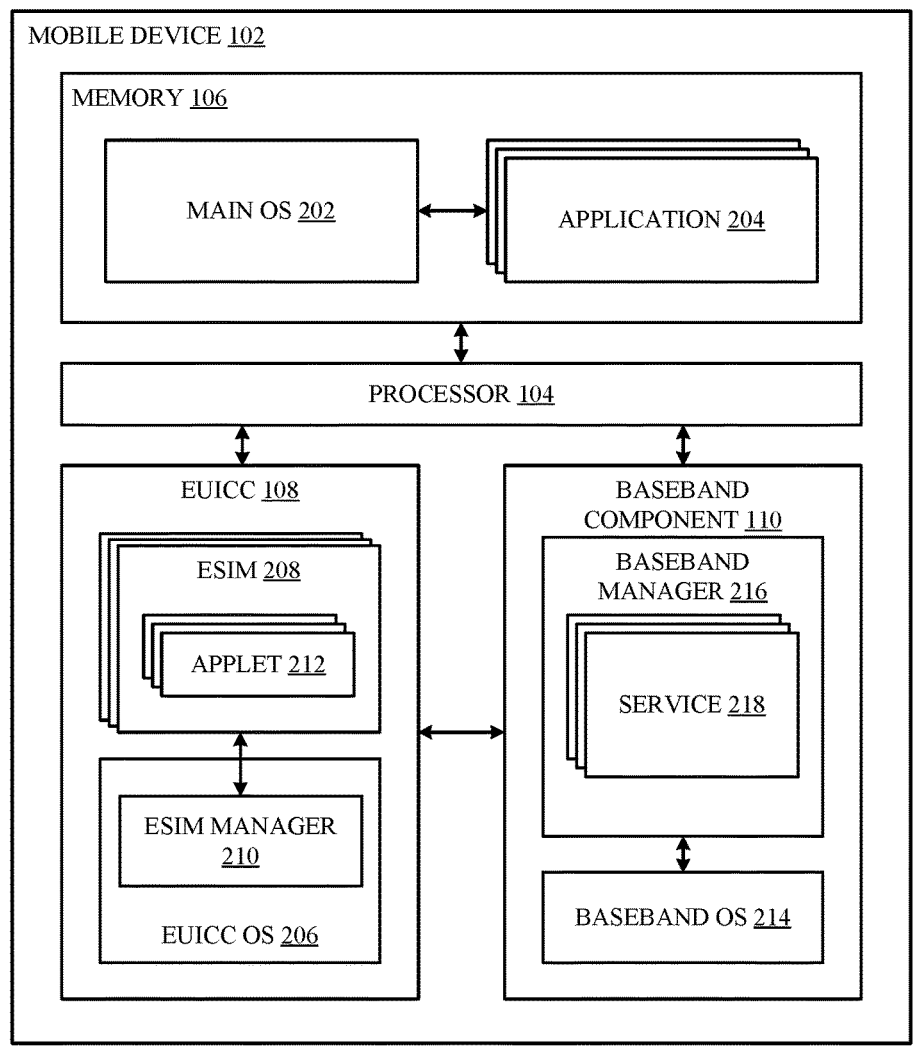
FIG. 2 illustrates a block diagram of a more detailed view of exemplary components of the system of FIG. 1, according to some embodiments.

FIG. 2 illustrates a block diagram of a more detailed view 200 of particular components of the mobile device 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the baseband component 110 with access to the eSIMs 208 to provide access to wireless services for the mobile device 102. The eUICC 108 OS can include an eSIM manager 210, which in some embodiments can be an Issue Security Domain (ISD) level application, a "security domain" in accordance with a GlobalPlatform specification, a security domain associated with one or more eSIMs and that calls additional eUICC OS installation services, and/or an application that implements a specific set of security services, e.g., for establishing and managing a secure channel and/or to provide encryption/decryption functions. The eSIM manager 210 can perform management functions for various eSIMs as described further herein. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the mobile device 102 to communicate with an MNO 114 and provide useful features (e.g., phone calls and internet) to a user of the mobile device 102.

As also shown in FIG. 2, the baseband component 110 of the mobile device 102 can include a baseband OS 214 that is configured to manage hardware resources of the baseband component 110 (e.g., a processor, a memory, different radio components, etc.). According to some embodiments, the baseband component 110 can implement a manager 216 that is configured to interface with the eUICC 108 to implement various techniques described herein, which can include establishing a secure channel with a provisioning server 116 and obtaining information (such as eSIM data) from the provisioning server 116 for purposes of managing eSIMs 208, including but not limited to provisioning, loading, installing, adding, modifying, updating, deleting, or performing other management operations for one or more eSIMs 208. As also shown in FIG. 2, the manager 216 can be configured to implement services 218, which represents a collection of software modules that are instantiated by way of the various applets 212 of enabled eSIMs 208 that are included in the eUICC 108. For example, services 218 can be configured to manage different connections between the mobile device 102 and MNOs 114 according to the different eSIMs 208 that are enabled within the eUICC 108.

Figure 3:
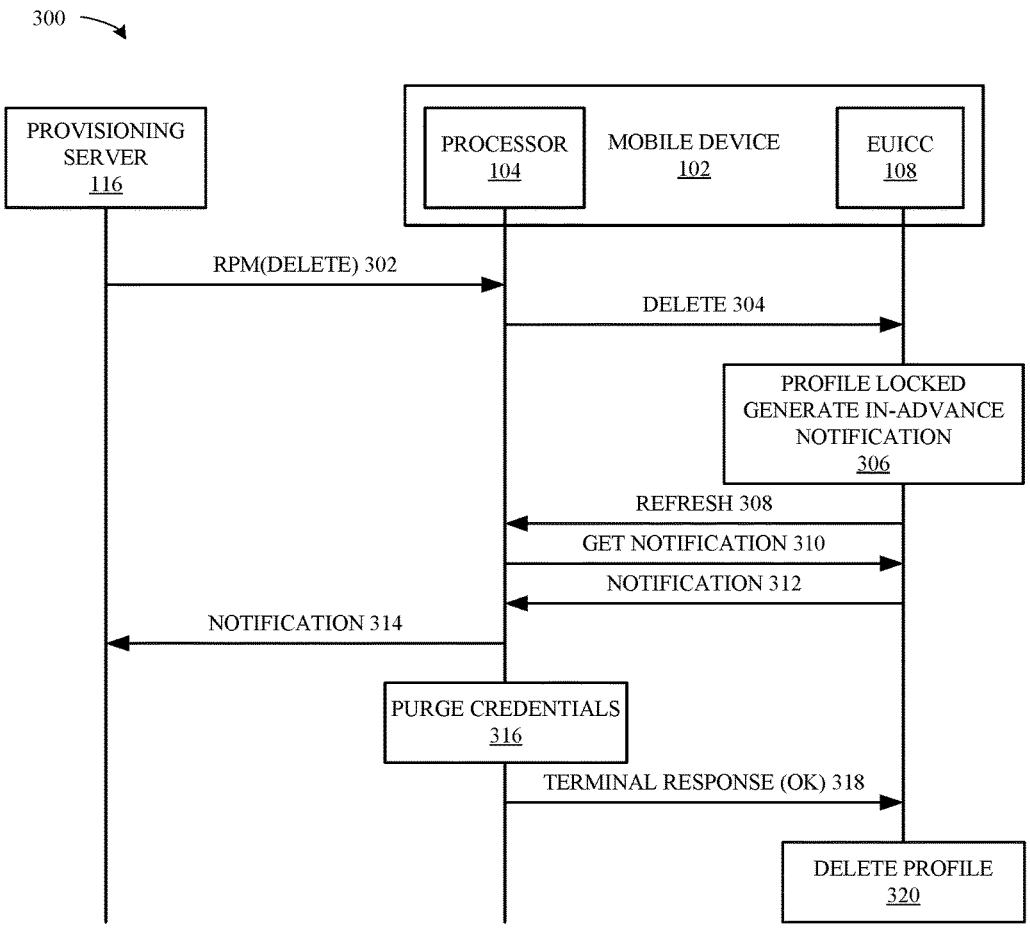
FIG. 3 illustrates an exemplary message exchange to provide in-advance notifications with eSIM management, according to some embodiments.

FIG. 3 illustrates a diagram 300 of an exemplary message exchange to provide in-advance notifications with eSIM management, according to some embodiments. At 302, processing circuitry of the mobile device 102, such as the processor 104, receives from a network entity, such as the provisioning server 116, a command to change the state of an eSIM 208 (which can also referred to as a profile as designated in FIG. 3) on the eUICC 108 of the mobile device 102. In some embodiments, the command to change the state of the eSIM 208 indicates that the eSIM 208 is to be deleted (or to be disabled). In some embodiments, the command is a remote profile management (RPM) command. At 304, the processor 104 of the mobile device communicates a corresponding delete (or disable) command to the eUICC 108 indicating the commanded change for the state of the eSIM 208 on the eUICC 108. At 306, responsive to receipt of the delete (or disable) command, the eUICC 108 can change the state of the eSIM 208 to a locked state and can generate an "in-advance" notification for the subsequent state change (to the deleted state or to the disabled state) for the eSIM 208. At 308, the eUICC 108 provides an indication to the processor 104 to retrieve a status update for the eSIM 208 of the eUICC 108. In some embodiments, the indication provided to the processor 104 includes a REFRESH command. In some embodiments, the communication of the REFRESH command from the eUICC 108 to the processor is optional, as the processor 104 can have knowledge of the RPM command to delete (or to disable) the eSIM 208 and can recognize that a notification update for the eSIM 208 is to be retrieved from the eUICC 108. At 310, the processor 104 sends a command to the eUICC 108, such as a GET NOTIFICATION command to retrieve a notification update from the eUICC 108 for the eSIM 208. At 312, the eUICC 108 provides a notification to the processor 104, the notification including an indication of the state change of the eSIM 208. In some embodiments, the indicated stated change for the eSIM 208 is that the eSIM 208 is deleted (or in a deleted state). In some embodiments, the indicated state change for the eSIM 208 is that the eSIM 208 is in a disabled state. In some embodiments, the indicated state change for the eSIM 208 is that the eSIM 208 is in a locked state. In some embodiments, the notification of the eSIM state change is provided to the processor 104 to send to an applicable network entity. In some embodiments, the notification is generated and provided to the processor 104 for communication to the applicable network entity before completion of the state change for the eSIM 208 on the eUICC 108 as indicated in the notification. At 314, the processor 104 sends the notification of the state change for the eSIM 208 received from the eUICC 108 to the applicable network entity, e.g., to the provisioning server 116. At 316, the processor 316 performs a local update to purge credentials and/or data associated with the eSIM 208 and other network clean up tasks, such as resetting associated wireless network software stacks. At 318, the processor 104 provides a response message to the eUICC 108 indicating successful delivery of the notification of the state change of the eSIM 208 to the provisioning server 116. In some embodiments, the response includes a TERMINAL RESPONSE (OK) message. At 320, after receipt of the response message from the processor 104, the eUICC 108 completes the change of state of the eSIM 208, e.g. by deleting the eSIM 208 or by disabling the eSIM 208.

In some embodiments, the processor 104 of the mobile device is aware of the generation of "in advance" notification by the eUICC 108 for state changes of the eSIM 208, such as based on a profile policy for the eSIM 208, or based on a parameter of a command received from the eUICC 108 or from the provisioning server 116, or based on a setting of the eUICC 108. In some embodiments, the processor 104 of the mobile device, when aware of a forthcoming disable or delete state change for an eSIM 208 of the eUICC 108, such as based on receipt of a command from the provisioning server 116, and when aware of the use of "in advance" notification by the eUICC 108 for such state changes for eSIMs 208 of the eUICC 108, can obtain a notification from the eUICC 108 and deliver the notification to the provisioning server 116 before providing a response (e.g., TERMINAL RESPONSE (OK)) after receipt of a command (e.g., REFRESH) from the eUICC 108 indicating the forthcoming state change for the eSIM 208 of the eUICC 108. The processor 104 of the mobile device, in some embodiments, can use credentials associated with the eSIM 208, while the eSIM 208 is in the locked state, to authenticate, to re-authenticate, to establish a connection, to re-establish a connection, and/or to maintain a connection via a wireless network in order to communicate the notification to an applicable network entity, e.g., to the provisioning server 116.

Figure 4:
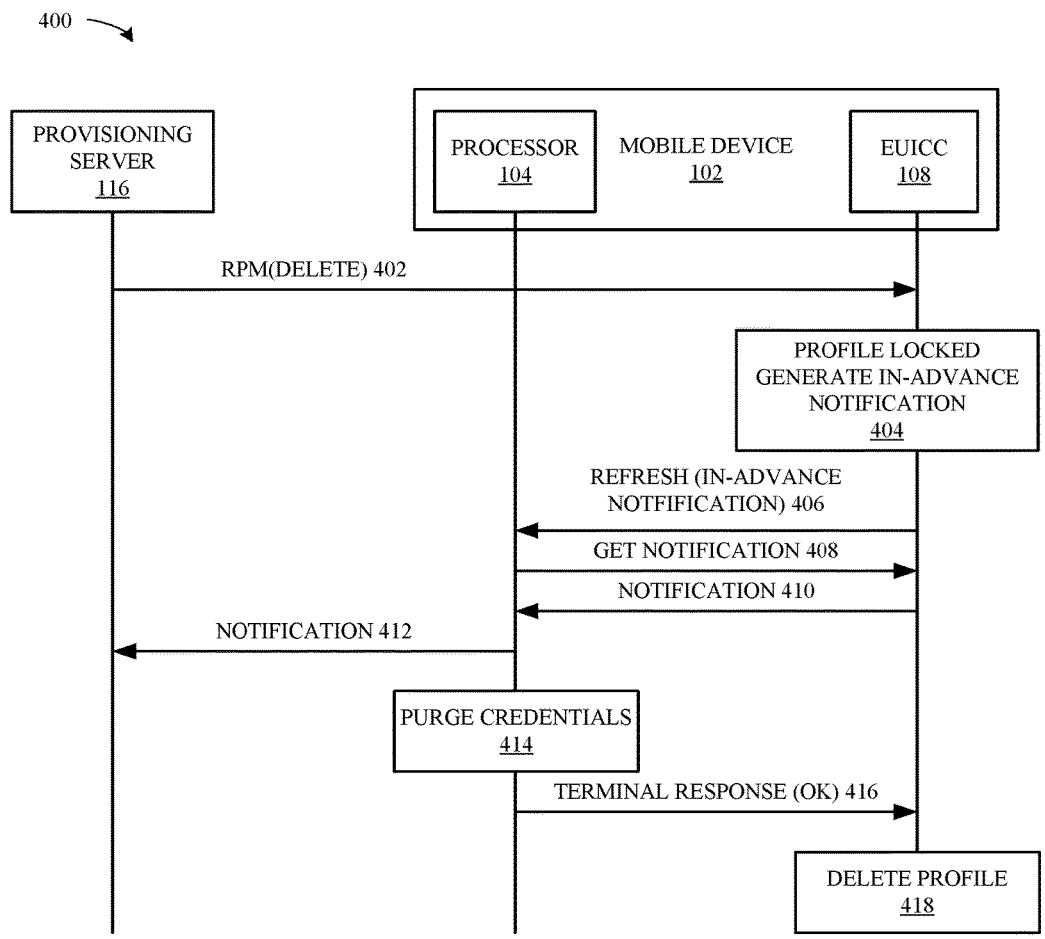
FIG. 4 illustrates another exemplary message exchange to provide in-advance notifications with eSIM management, according to some embodiments.

FIG. 4 illustrates a diagram 400 of another exemplary message exchange to provide in-advance notifications with eSIM management, according to some embodiments. At 402, the eUICC 108 of the mobile device 102, receives from a network entity, such as the provisioning server 116, a command to change the state of an eSIM 208 (which can also referred to as a profile as designated in FIG. 4) on the eUICC 108 of the mobile device 102. In some embodiments, the command to change the state of the eSIM 208 indicates that the eSIM 208 is to be deleted (or to be disabled). In some embodiments, the command is a remote profile management (RPM) command. In some embodiments, the command is encrypted by the provisioning server and decrypted by the eUICC 108, while the processor 104 of the mobile device 102 provides a pass through forwarding function without decrypting (or reading or otherwise aware of) the content of the command. At 404, responsive to receipt of the delete (or disable) command, the eUICC 108 can change the state of the eSIM 208 to a locked state and can generate an "in-advance" notification for the subsequent state change (to the deleted state or to the disabled state) for the eSIM 208. At 406, the eUICC 108 provides an indication to the processor 104 to retrieve a status update for the eSIM 208 of the eUICC 108. In some embodiments, the indication provided to the processor 104 includes a REFRESH command including an indication of an in-advance notification to be retrieved by the processor 104. In some embodiments, the communication of the REFERESH command from the eUICC 108 to the processor is required, as the processor 104 can have no knowledge of the RPM command to delete (or to disable) the eSIM 208 (being unable to interpret the RPM command). At 408, the processor 104 sends a command to the eUICC 108, such as a GET NOTIFICATION command to retrieve a notification update from the eUICC 108 for the eSIM 208. At 410, the eUICC 108 provides a notification to the processor 104, the notification including an indication of the state change of the eSIM 208. In some embodiments, the indicated stated change for the eSIM 208 is that the eSIM 208 is deleted (or in a deleted state). In some embodiments, the indicated state change for the eSIM 208 is that the eSIM 208 is in a disabled state. In some embodiments, the indicated state change for the eSIM 208 is that the eSIM 208 is in a locked state. In some embodiments, the notification of the eSIM state change is provided to the processor 104 to send to an applicable network entity. In some embodiments, the notification is generated and provided to the processor 104 for communication to the applicable network entity before completion of the state change for the eSIM 208 on the eUICC 108 as indicated in the notification. At 412, the processor 104 sends the notification of the state change for the eSIM 208 received from the eUICC 108 to the applicable network entity, e.g., to the provisioning server 116. At 414, the processor 316 performs a local update to purge credentials associated with the eSIM 208 and other network clean up tasks, such as resetting associated wireless network software stacks. At 416, the processor 104 provides a response message to the eUICC 108 indicating successful delivery of the notification of the state change of the eSIM 208 to the provisioning server 116. In some embodiments, the response includes a TERMINAL RESPONSE (OK) message. At 418, after receipt of the response message from the processor 104, the eUICC 108 completes the change of state of the eSIM 208, e.g. by deleting the eSIM 208 or by disabling the eSIM 208. The processor 104 of the mobile device, in some embodiments, can use credentials associated with the eSIM 208, while the eSIM 208 is in the locked state, to authenticate, to re-authenticate, to establish a connection, to re-establish a connection, and/or to maintain a connection via a wireless network in order to communicate the notification to an applicable network entity, e.g., to the provisioning server 116.

Figure 5:
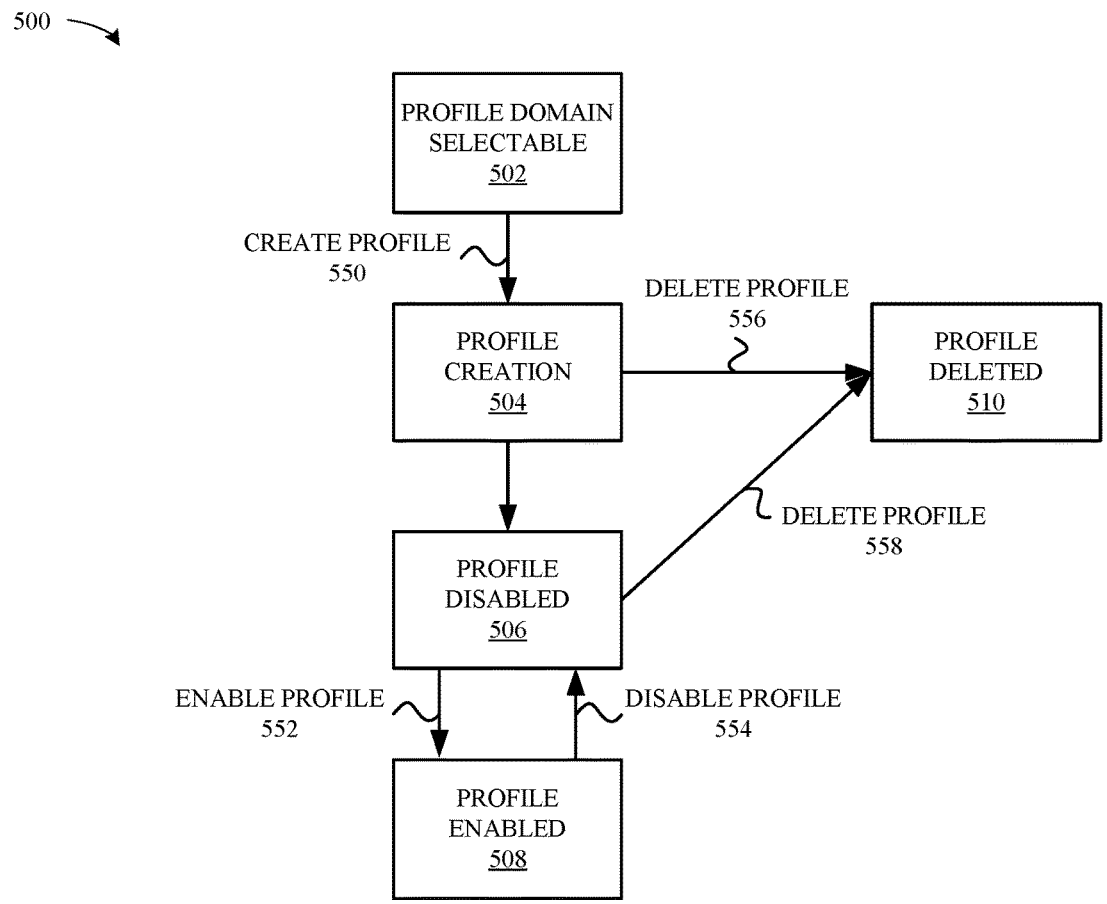
FIG. 5 illustrates an exemplary state diagram for eSIM management, according to some embodiments.

FIG. 5 illustrates an exemplary state diagram 500 for eSIM (profile) management, according to some embodiments. The state diagram 500 of FIG. 5 does not include a locked state for the eSIM 208, and as such can represent a presently used profile domain life cycle without use of an in-advance notification for state changes of an eSIM 208. Initially, in state 502, a profile domain is selectable. At 550, a create profile function can be executed causing an eSIM 208 to be created and transitioning to the profile creation state 504. If the eSIM 208 is not successfully created, e.g., an error occurs in the creation process, at 556, the faulty eSIM 208 can be deleted by transitioning to the deleted stated 510. If the eSIM 208 is successfully created, the eSIM 208 can be placed initially in a disabled state 506, from which the eSIM 208 can be transitioned, at 552, to the enabled state 508. Similarly, while in the enabled state 508, the eSIM 208 can be transitioned, at 554, to the disabled state 506. From the disabled state 506, at 558, the eSIM 208 can be transitioned to the deleted state 510. Notably, in FIG. 5, an eSIM 208 in the enabled state 508 can transition to the deleted state 510 only by transitioning through the disabled state 506.

Figure 6:
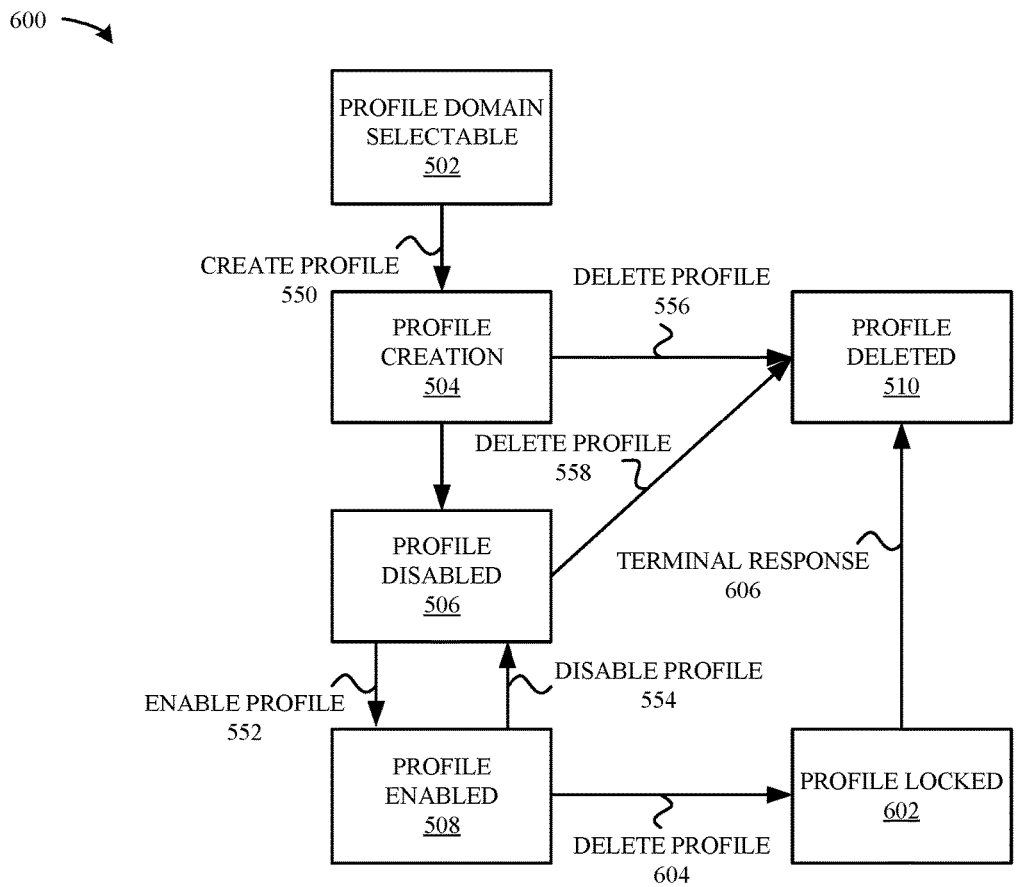
FIG. 6 illustrates another exemplary state diagram for eSIM management, according to some embodiments.

FIG. 6 illustrates another exemplary state diagram 600 for eSIM (profile) management, according to some embodiments. The state diagram 600 of FIG. 6 includes a locked state 602 for the eSIM 208. An eSIM 208 in the enabled state 508, at 604, can be transitioned to the locked state 602 in response to receipt of a delete command for the eSIM 208. The eSIM 208 can remain in the locked state 602 until receiving a response from processing circuitry external to the eUICC 108 that notification of the state change for the eSIM 208 has been successfully delivered. At 606, after receipt of the response indicating successful delivery of the notification of the state change of the eSIM 208, the eSIM 208 can transition to the deleted state 510. While in the locked state, applications and/or files of the eSIM 208 can be inaccessible or otherwise unusable by processing circuitry of the mobile device 102 external to the eUICC 108. By placing the eSIM 208 in a locked state, the eUICC 108 can ensure that the eSIM 208 will not be used, including conditions where the processing circuitry of the mobile device 102 external to the eUICC 108 does not properly complete a reset/refresh cleanup for the associated credentials of the eSIM 208. In some embodiments, while the eSIM 208 is in the locked state, applications and/or files of the eSIM 208 can be accessible with restrictions, e.g., for a limited number of access requests and/or for a limited period of time, and otherwise be unusable by processing circuitry of the mobile device 102 external to the eUICC 108 after the restrictions are met, e.g., after the limited number of access requests occur and/or after the limited period of time occurs.

Figure 7:
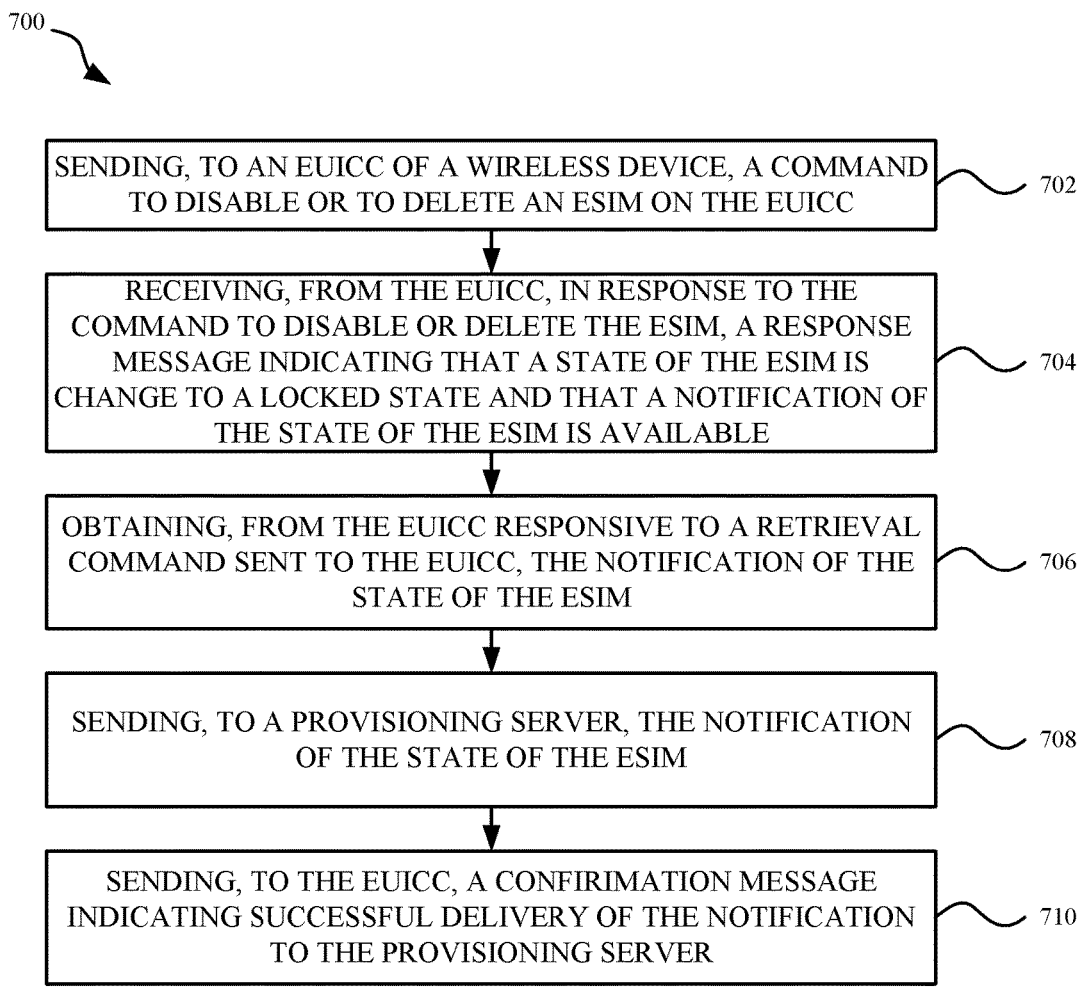
FIG. 7 illustrates a flow diagram of an exemplary method for providing in-advance notifications with eSIM management, according to some embodiments.

FIG. 7 illustrates a flow diagram 700 of an exemplary method for providing in-advance notifications with eSIM management, according to some embodiments. The method illustrated by the flow diagram 700 of FIG. 7 can be performed, in some embodiments, by processing circuitry of the mobile device 102 external to the eUICC 108, such as by at least the processor 104. At 702, the processor 104 sends, to the eUICC 108, a command to disable or to delete an eSIM 208 on the eUICC 108. At 704, the processor 104 receives, from the eUICC 08 in response to the command to disable or to delete the eSIM 208, a response message indicating that a state of the eSIM 208 is changed to a locked state and that a notification of the state of the eSIM 208 is available for retrieval. At 706, the processor 104 obtains, from the eUICC 108 responsive to a retrieval command sent to the eUICC 108 by the processor 104, the notification of the state of the eSIM 208. At 708, the processor 104 sends, to a provisioning server 116, the notification of the state of the eSIM 208 obtained from the eUICC 108. At 710, the processor 104, sends, to the eUICC 108, a confirmation message indicating to the eUICC 108 successful delivery of the notification to the provisioning server 116.

In some embodiments, the processor 104 receives from the provisioning server 116, a remote profile management (RPM) command to delete or to disable the eSIM 208 on the eUICC 108. In some embodiments, the processor 104 sends, to the eUICC 108, the command to disable or to delete the eSIM 208 on the eUICC 108 in response to receipt of the RPM command. In some embodiments, the eUICC 108 waits to delete or to disable the eSIM 208 on the eUICC 108 until after receipt of the confirmation message from the processing circuitry of the wireless device external to the eUICC 108. In some embodiments, the processor 104 deletes credentials for the deleted or disabled eSIM 208 after successful delivery of the notification to the provisioning server 116. In some embodiments, the processor 104 resets a network stack associated with the deleted or disabled eSIM 208 after successful delivery of the notification to the provisioning server 116. In some embodiments, the processor 104 maintains credentials for the eSIM 208, while in the locked state, until after successful delivery of the notification to the provisioning server 116. In some embodiments, the processor 104 uses the credentials for the eSIM 208, while in the locked state, to authenticate with a wireless network to establish or to maintain a connection to deliver the notification to the provisioning server 116. In some embodiments, the processor 104 restricts use of the credentials for the eSIM 208, while in the locked state, to at most an authentication threshold number of times. In some embodiments, applications and files of the eSIM 208 on the eUICC 108 are unusable while the eSIM 208 is in the locked state.

Figure 8:
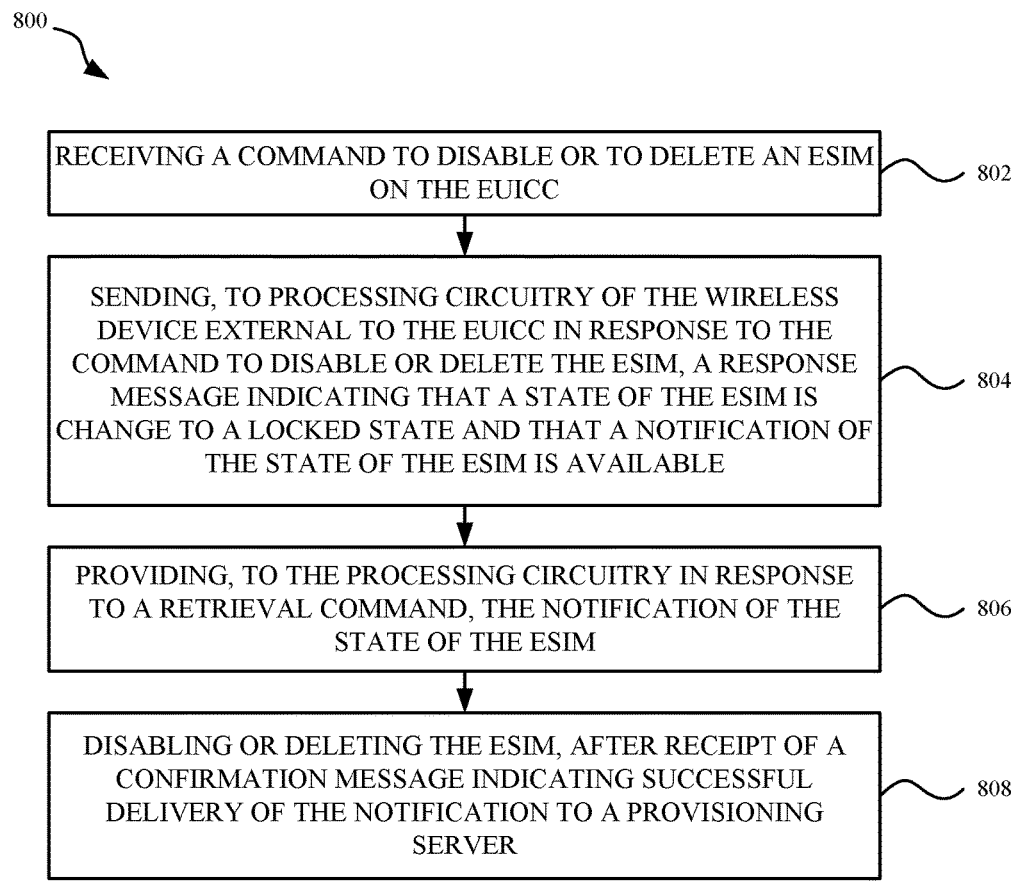
FIG. 8 illustrates a flow diagram of another exemplary method for providing in-advance notifications with eSIM management, according to some embodiments.

FIG. 8 illustrates a flow diagram 800 of another exemplary method for providing in-advance notifications with eSIM management, according to some embodiments. The method illustrated by the flow diagram 800 of FIG. 8 can be performed, in some embodiments, by the eUICC 108 of the mobile device 102. At 802, the eUICC 108 receives a command to disable or to delete an eSIM 208 on the eUICC 108. At 804, the eUICC 108 sends, to processing circuitry of the wireless device external to the eUICC 108, e.g., at least the processor 104, in response to the command to disable or delete the eSIM 208, a response message indicating that a state of the eSIM 208 is changed to a locked state and that a notification of the state of the eSIM 208 is available for retrieval. At 806, the eUICC 108 provides, to the processor 104 in response to receipt of a retrieval command, the notification of the state of the eSIM 208. At 808, the eUICC 108, disables or deletes the eSIM 208, in accordance with the previous command, after receipt of a confirmation message indicating successful delivery of the notification to a provisioning server 116.

In some embodiments, the eUICC 108 of the mobile device 102 generates the notification of the state of the eSIM 208 before disabling or deleting the eSIM 208, where the notification of the state of the eSIM 208 indicates that the state of the eSIM 208 is disabled or deleted. In some embodiments, the response message indicates to the processor 104 of the mobile device 102 to retrieve the notification of the state of the eSIM 208 before sending to the eUICC 108 the confirmation message that acknowledges receipt of the response message. In some embodiments, the eUICC 108 receives the command to disable or to delete the eSIM 208 on the eUICC 108 from the processor 104 of the mobile device 102. In some embodiments, the eUICC 108 receives the command to disable or to delete the eSIM 208 on the eUICC 108 from the provisioning server 116, e.g., with the processor 104 of the mobile device 102 acting as a pass-through forwarding agent for the command. In some embodiments, the command to disable or to delete the eSIM 208 on the eUICC 108 is encrypted, and the processor 104 of the mobile device 102 is unable to read the command. In some embodiments, applications and files of the eSIM 208 on the eUICC 108 are unusable while the eSIM 208 is in the locked state.

Figure 9:
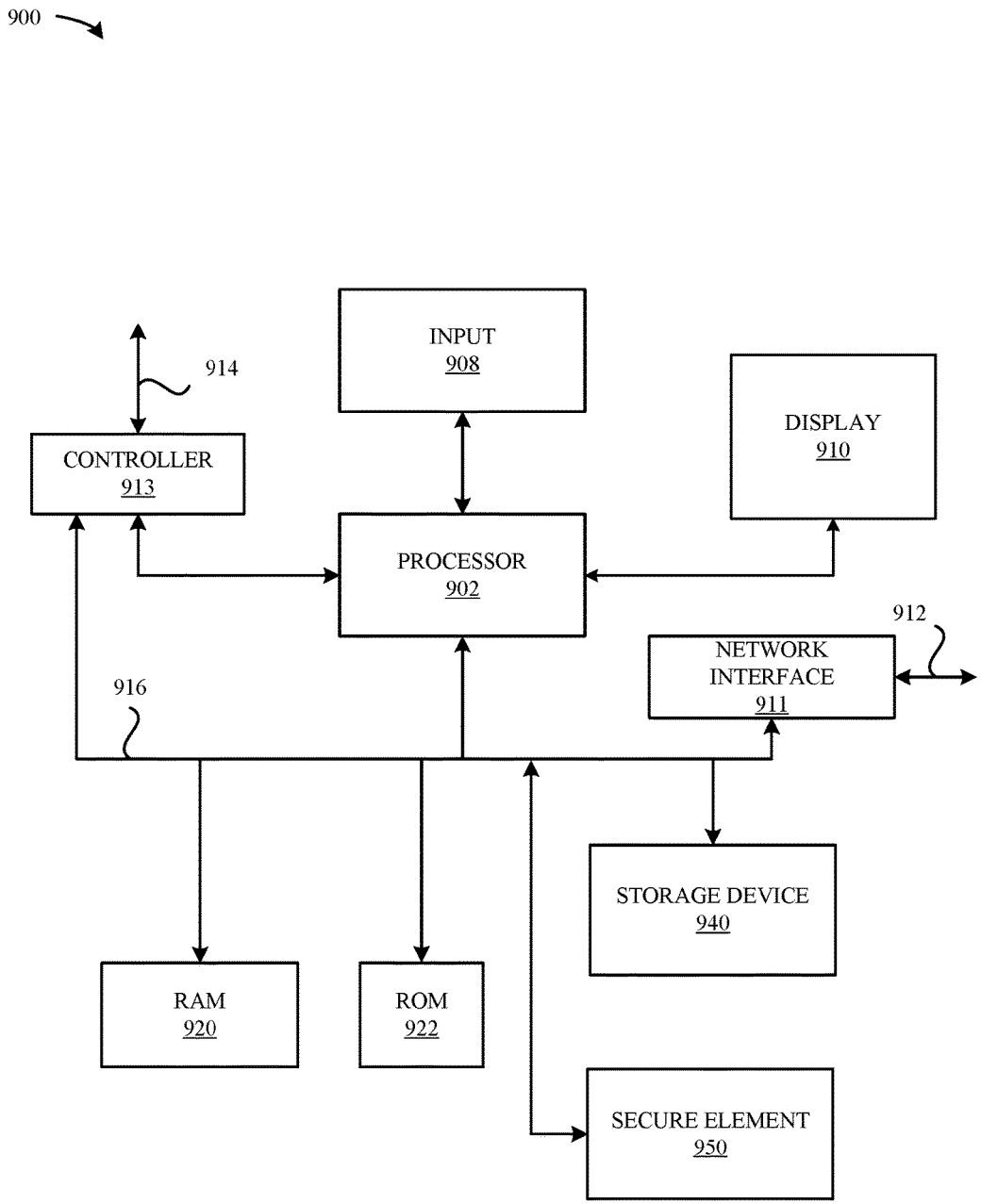
FIG. 9 illustrates a detailed view of a representative computing device that can be used to implement various methods described herein, according to some embodiments.

FIG. 9 illustrates a detailed view of a representative computing device 900 that can be used to implement various methods described herein, according to some embodiments.

In particular, the detailed view illustrates various components that can be included in the mobile device 102 illustrated in FIG. 1. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to display information to the user. A data bus 916 can facilitate data transfer between at least a storage device 940, the processor 902, and a controller 913. The controller 913 can be used to interface with and control different equipment through and equipment control bus 914. The computing device 900 can also include a network/bus interface 911 that couples to a data link 912. In the case of a wireless connection, the network/bus interface 911 can include a wireless transceiver.

The computing device 900 also include a storage device 940, which can comprise a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900. The computing device 900 can further include a secure element 950, which can represent the eUICC 108 illustrated in FIGS. 1 to 4 and described in detail herein.

Representative Exemplary Embodiments

In some embodiments, a method for managing notifications for electronic Subscriber Identity Modules (eSIMs) on an embedded Universal Integrated Circuit Card (eUICC) included in a wireless device includes processing circuitry of the wireless device external to the eUICC: (i) sending, to the eUICC, a command to disable or to delete an eSIM on the eUICC; (ii) receiving, from the eUICC in response to the command to disable or to delete the eSIM, a response message indicating that a state of the eSIM is changed to a locked state and that a notification of the state of the eSIM is available; (iii) obtaining, from the eUICC responsive to a retrieval command sent to the eUICC, the notification of the state of the eSIM; (iv) sending, to a provisioning server, the notification of the state of the eSIM; and (v) sending, to the eUICC, a confirmation message indicating successful delivery of the notification to the provisioning server.

In some embodiments, the method further includes the processing circuitry of the wireless device external to the eUICC receiving, from the provisioning server, a remote profile management (RPM) command to delete or to disable the eSIM on the eUICC, where the sending, to the eUICC, the command to disable or to delete the eSIM on the eUICC is performed in response to receipt of the RPM command. In some embodiments, the eUICC waits to delete or to disable the eSIM on the eUICC until after receipt of the confirmation message from the processing circuitry of the wireless device external to the eUICC. In some embodiments, the method further includes the processing circuitry of the wireless device external to the eUICC deleting credentials for the deleted or disabled eSIM after successful delivery of the notification to the provisioning server. In some embodiments, the method further includes the processing circuitry of the wireless device external to the eUICC resetting a network stack associated with the deleted or disabled eSIM after successful delivery of the notification to the provisioning server. In some embodiments, the method further includes the processing circuitry of the wireless device external to the eUICC maintaining credentials for the eSIM, while in the locked state, until after successful delivery of the notification to the provisioning server. In some embodiments, the method further includes the processing circuitry of the wireless device external to the eUICC using the credentials for the eSIM, while in the locked state, to authenticate with a wireless network to establish or to maintain a connection to deliver the notification to the provisioning server. In some embodiments, the method further includes the processing circuitry of the wireless device external to the eUICC restricting use of the credentials for the eSIM, while in the locked state, to at most an authentication threshold number of times. In some embodiments, applications and files of the eSIM on the eUICC are unusable while the eSIM is in the locked state.

In some embodiments, a method for managing notifications for electronic Subscriber Identity Modules (eSIMs) on an embedded Universal Integrated Circuit Card (eUICC) included in a wireless device includes the eUICC: (i) receiving a command to disable or to delete an eSIM on the eUICC; (ii) sending, to processing circuitry of the wireless device external to the eUICC in response to the command to disable or delete the eSIM, a response message indicating that a state of the eSIM is changed to a locked state and that a notification of the state of the eSIM is available; (iii) providing, to the processing circuitry in response to a retrieval command, the notification of the state of the eSIM; and (iv) disabling or deleting the eSIM, after receipt of a confirmation message indicating successful delivery of the notification to a provisioning server.

In some embodiments, the method further includes the eUICC generating the notification of the state of the eSIM before disabling or deleting the eSIM, where the notification of the state of the eSIM indicates that the state of the eSIM is disabled or deleted. In some embodiments, the response message indicates to the processing circuitry of the wireless device to retrieve the notification of the state of the eSIM before sending to the eUICC the confirmation message. In some embodiments, the eUICC receives the command to disable or to delete the eSIM on the eUICC from the processing circuitry of the wireless device. In some embodiments, the eUICC receives the command to disable or to delete the eSIM on the eUICC from the provisioning server. In some embodiments, the command to disable or to delete the eSIM on the eUICC is encrypted, and the processing circuitry of the wireless device is unable to read the command. In some embodiments, applications and files of the eSIM on the eUICC are unusable while the eSIM is in the locked state.

In some embodiments, an apparatus configurable for operation in a wireless device includes processing circuitry communicatively coupled to an eUICC of the wireless device, the processing circuitry configured to perform a method for managing notifications for electronic Subscriber Identity Modules (eSIMs) on the eUICC, the method including: (i) sending, to the eUICC, a command to disable or to delete an eSIM on the eUICC; (ii) receiving, from the eUICC in response to the command to disable or delete the eSIM, a response message indicating that a state of the eSIM is changed to a locked state and that a notification of the state of the eSIM is available; (iii) obtaining, from the eUICC responsive to a retrieval command sent to the eUICC, the notification of the state of the eSIM; (iv) sending, to a provisioning server, the notification of the state of the eSIM; and (v) sending, to the eUICC, a confirmation message indicating successful delivery of the notification to the provisioning server.

In some embodiments, an embedded Universal Integrated Circuit Card (eUICC), configurable for operation in a wireless device, is configured to perform a method for managing notifications for electronic Subscriber Identity Modules (eSIMs) on the eUICC, the method including the eUICC: (i) receiving a command to disable or to delete an eSIM on the eUICC; (ii) sending, to processing circuitry of the wireless device external to the eUICC in response to the command to disable or delete the eSIM, a response message indicating that a state of the eSIM is changed to a locked state and that a notification of the state of the eSIM is available; (iii) providing, to the processing circuitry in response to a retrieval command, the notification of the state of the eSIM; and (iv) disabling or deleting the eSIM, after receipt of a confirmation message indicating successful delivery of the notification to the provisioning server.

In some embodiments, a wireless device includes (i) wireless circuitry including one or more transceivers communicatively coupled to one or more antennas configurable for transmitting to and receiving from a wireless network wireless radio frequency signals; (ii) an embedded Universal Integrated Circuit Card (eUICC); and (iii) processing circuitry including one or more processors communicatively coupled to the eUICC and to a storage medium storing instructions that, when executed by the one or more processors, cause the processing circuitry of the wireless device to perform a method for managing notifications for electronic Subscriber Identity Modules (eSIMs) on the eUICC, where the method includes: (a) sending, to the eUICC, a command to disable or to delete an eSIM on the eUICC; (b) receiving, from the eUICC in response to the command to disable or delete the eSIM, a response message indicating that a state of the eSIM is changed to a locked state and that a notification of the state of the eSIM is available; (c) obtaining, from the eUICC responsive to a retrieval command sent to the eUICC, the notification of the state of the eSIM; (d) sending, to a provisioning server, the notification of the state of the eSIM; and (e) sending, to the eUICC, a confirmation message indicating successful delivery of the notification to the provisioning server.

In some embodiments, a wireless device includes (i) wireless circuitry including one or more transceivers communicatively coupled to one or more antennas configurable for transmission and reception of wireless radio frequency signals of a wireless network; (ii) processing circuitry including one or more processors communicatively coupled to the wireless circuitry; and (iii) an embedded Universal Integrated Circuit Card (eUICC) including a processor and a storage medium storing instructions that, when executed by the processor of the eUICC, cause the eUICC to perform a method for managing notifications for electronic Subscriber Identity Modules (eSIMs) on the eUICC, the method including: (a) receiving a command to disable or to delete an eSIM on the eUICC; (b) sending, to processing circuitry of the wireless device external to the eUICC in response to the command to disable or delete the eSIM, a response message indicating that a state of the eSIM is changed to a locked state and that a notification of the state of the eSIM is available; (c) providing, to the processing circuitry in response to a retrieval command, the notification of the state of the eSIM; and (d) disabling or deleting the eSIM, after receipt of a confirmation message indicating successful delivery of the notification to the provisioning server.

The various aspects, embodiments, implementations or features of the described embodiments can be used separately or in any combination. Software, hardware, or a combination of hardware and software can implement various aspects of the described embodiments. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing notifications for electronic Subscriber Identity Modules (eSIMs) on an embedded Universal Integrated Circuit Card (eUICC) included in a wireless device, the method comprising:
   by processing circuitry of the wireless device external to the eUICC:
   sending, to the eUICC, a command to disable or to delete an eSIM on the eUICC;
   receiving, from the eUICC in response to the command to disable or to delete the eSIM, a response message indicating that a state of the eSIM is changed to a locked state and that a notification of the state of the eSIM is available;
   obtaining, from the eUICC responsive to a retrieval command sent to the eUICC, the notification of the state of the eSIM, the notification indicating the state of the eSIM is disabled or deleted;
   sending, to a provisioning server, the notification of the state of the eSIM; and
   sending, to the eUICC, a confirmation message indicating successful delivery of the notification to the provisioning server,
   wherein the eSIM on the eUICC remains in the locked state at least until the confirmation message is provided to the eUICC.

2. The method of claim 1, further comprising:
   by the processing circuitry of the wireless device external to the eUICC:

receiving, from the provisioning server, a remote profile management (RPM) command to delete or to disable the eSIM on the eUICC, wherein the sending, to the eUICC, the command to disable or to delete the eSIM on the eUICC is performed in response to receipt of the RPM command.

3. The method of claim 1, wherein the eUICC waits to delete or to disable the eSIM on the eUICC until after receipt of the confirmation message from the processing circuitry of the wireless device external to the eUICC.

4. The method of claim 1, further comprising:
by the processing circuitry of the wireless device external to the eUICC:
deleting credentials for the deleted or disabled eSIM after successful delivery of the notification to the provisioning server.

5. The method of claim 4, further comprising:
by the processing circuitry of the wireless device external to the eUICC:
resetting a network stack associated with the deleted or disabled eSIM after successful delivery of the notification to the provisioning server.

6. The method of claim 1, further comprising:
by the processing circuitry of the wireless device external to the eUICC:
maintaining credentials for the eSIM, while in the locked state, until after successful delivery of the notification to the provisioning server.

7. The method of claim 6, further comprising:
by the processing circuitry of the wireless device external to the eUICC:
using the credentials for the eSIM, while in the locked state, to authenticate with a wireless network to establish or to maintain a connection to deliver the notification to the provisioning server.

8. The method of claim 6, further comprising:
by the processing circuitry of the wireless device external to the eUICC:
restricting use of the credentials for the eSIM, while in the locked state, to at most an authentication threshold number of times.

9. The method of claim 1, wherein applications and files of the eSIM on the eUICC are unusable while the eSIM is in the locked state.

10. A method for managing notifications for electronic Subscriber Identity Modules (eSIMs) on an embedded Universal Integrated Circuit Card (eUICC) included in a wireless device, the method comprising:
by the eUICC:
receiving a command to disable or to delete an eSIM on the eUICC;
sending, to processing circuitry of the wireless device external to the eUICC in response to the command to disable or delete the eSIM, a response message indicating that a state of the eSIM is changed to a locked state and that a notification of the state of the eSIM is available;
providing, to the processing circuitry in response to a retrieval command, the notification of the state of the eSIM, the notification indicating the state of the eSIM is disabled or deleted; and
disabling or deleting the eSIM, after receipt of a confirmation message indicating successful delivery of the notification to a provisioning server,
wherein the eSIM on the eUICC remains in the locked state at least until receipt of the confirmation message.

11. The method of claim 10, further comprising:
by the eUICC:
generating the notification of the state of the eSIM before disabling or deleting the eSIM.

12. The method of claim 10, wherein the response message indicates to the processing circuitry of the wireless device to retrieve the notification of the state of the eSIM before sending to the eUICC the confirmation message.

13. The method of claim 10, wherein the eUICC receives the command to disable or to delete the eSIM on the eUICC from the processing circuitry of the wireless device.

14. The method of claim 10, wherein the eUICC receives the command to disable or to delete the eSIM on the eUICC from the provisioning server.

15. The method of claim 14, wherein:
the command to disable or to delete the eSIM on the eUICC is encrypted, and
the processing circuitry of the wireless device is unable to read the command.

16. The method of claim 10, wherein applications and files of the eSIM on the eUICC are unusable while the eSIM is in the locked state.

17. An apparatus configurable for operation in a wireless device, the apparatus comprising:
processing circuitry communicatively coupled to an eUICC of the wireless device the processing circuitry configured to perform a method for managing notifications for electronic Subscriber Identity Modules (eSIMs) on the eUICC, the method comprising steps that include:
sending, to the eUICC, a command to disable or to delete an eSIM on the eUICC;
receiving, from the eUICC in response to the command to disable or delete the eSIM, a response message indicating that a state of the eSIM is changed to a locked state and that a notification of the state of the eSIM is available;
obtaining, from the eUICC responsive to a retrieval command sent to the eUICC, the notification of the state of the eSIM, the notification indicating the state of the eSIM is disabled or deleted;
sending, to a provisioning server, the notification of the state of the eSIM; and
sending, to the eUICC, a confirmation message indicating successful delivery of the notification to the provisioning server,
wherein the eSIM on the eUICC remains in the locked state at least until the confirmation message is provided to the eUICC.

18. The apparatus of claim 17, wherein the steps further include:
receiving, from the provisioning server, a remote profile management (RPM) command to delete or to disable the eSIM on the eUICC,
wherein the sending, to the eUICC, the command to disable or to delete the eSIM on the eUICC is performed in response to receipt of the RPM command.

19. The apparatus of claim 17, wherein the eUICC waits to delete or to disable the eSIM on the eUICC until after receipt of the confirmation message from the processing circuitry of the wireless device external to the eUICC.

20. The apparatus of claim 17, wherein the steps further include deleting credentials for the deleted or disabled eSIM after successful delivery of the notification to the provisioning server.

* * * * *